United States Patent [19]

Murakami

[11] Patent Number: 4,717,904
[45] Date of Patent: Jan. 5, 1988

[54] COLLISION RESPONSIVE SIGNAL EMITTER FOR A VEHICLE

[75] Inventor: Yuichi Murakami, Ikenohata, Japan

[73] Assignee: Aisin Seiki Kabushiki Kaisha, Aichi, Japan

[21] Appl. No.: 890,261

[22] Filed: Jul. 29, 1986

[30] Foreign Application Priority Data

Jul. 30, 1985 [JP] Japan ............................. 60-168400

[51] Int. Cl.⁴ ............................................. B60Q 9/00
[52] U.S. Cl. ................................ 340/52 H; 340/539; 455/99; 343/876
[58] Field of Search ............ 340/52 H, 539, 904, 340/989; 455/98, 99, 129, 277; 343/853, 876; 180/282

[56] References Cited

U.S. PATENT DOCUMENTS

| | | | |
|---|---|---|---|
| 2,938,999 | 5/1960 | Etter | 455/129 X |
| 3,022,392 | 2/1962 | Clemson | 340/52 H X |
| 3,123,801 | 3/1964 | Bosler | 340/52 H |
| 3,646,583 | 2/1972 | Scuderi | 340/52 H |
| 3,723,881 | 3/1973 | Burton | 455/98 |
| 3,922,685 | 11/1975 | Opas | 455/129 X |
| 3,990,040 | 11/1976 | Gleitz et al. | 340/52 H |
| 4,216,545 | 8/1980 | Flickshu et al. | 340/52 H X |
| 4,220,871 | 9/1980 | Yasui et al. | 340/52 H X |
| 4,443,790 | 4/1984 | Bishop | 340/539 |

Primary Examiner—James L. Rowland
Assistant Examiner—Brian R. Tumm
Attorney, Agent, or Firm—Sughrue, Mion, Zinn, Macpeak & Seas

[57] ABSTRACT

In the event of an accident encountered by a vehicle, an emergency signal is automatically transmitted for asking a rescue. An acceleration of the vehicle in the inclination of the vehicle and the presence or absence of water within the vehicle are detected, and an emergency signal is transmitted whenever one of these items indicates the occurrence of an abnormality. A plurality of antennae are disposed at mutually different locations on the vehicle, and are selectively used for transmission of an emergency signal. The antenna selected is periodically and sequentially changed.

1 Claim, 8 Drawing Figures

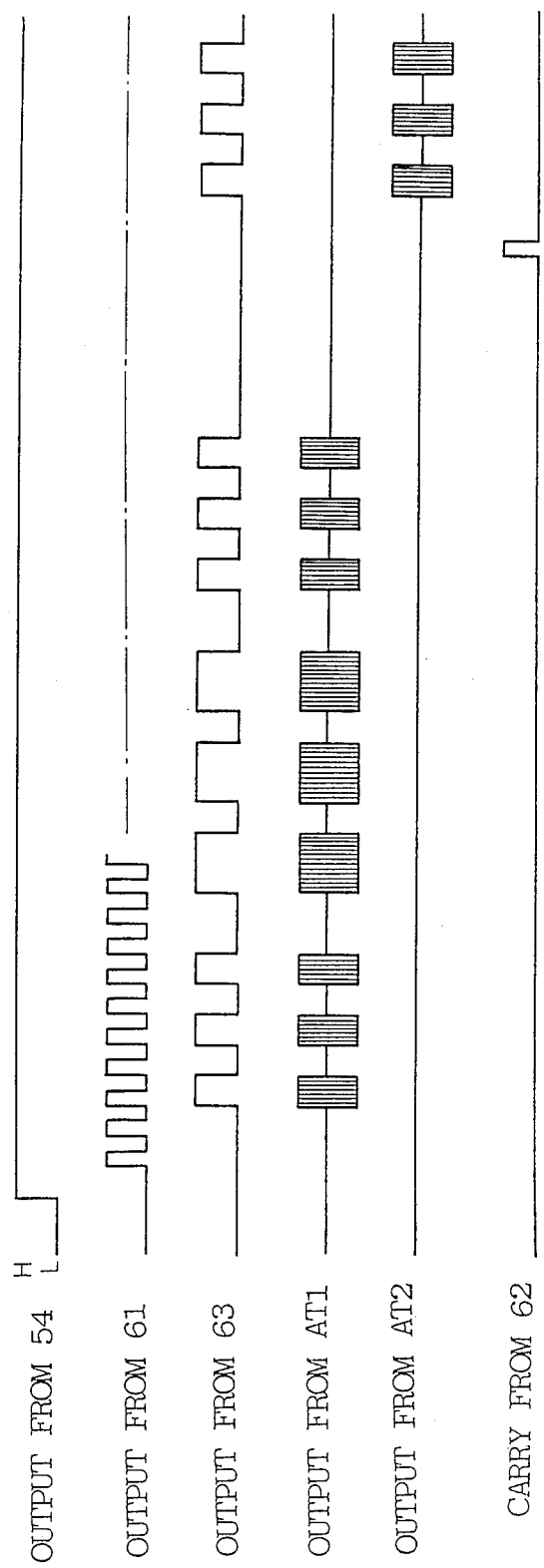

COLLISION RESPONSIVE SIGNAL EMITTER FOR A VEHICLE

BACKGROUND OF THE INVENTION

The invention relates to an automatic signal emitter mounted on a vehicle to emit a rescue request signal automatically in response to an emergency.

In the event of a traffic accident, an occupant of an automobile involved in the accident may request emergency assistance telephoning the police station if he is not seriously injured. If all the occupants of an automobile which encountered the accident are immovable, a passer-by will usually make the required communication. However, if the accident has occurred on a sparsely inhabited mountain roadway where there is little traffic and there is no communication means available even if one of the occupants is a delay will be caused in rescue which could lead to disastrous results. On the other hand, a proposal is made heretofore that an emergency signal emitter be provided on a rescue raft provided on marine vessels, for example. In addition, for aircraft, an apparatus is proposed which detects an acceleration of the aircraft in the fore-and-aft direction and which develops an emergency signal automatically in response to the acceleration in excess of a given value.

However, with road vehicles, a variety of different types of accidents are possible, making it difficult to provide an automatic emitter that will work under all conditions signal. For example, it is possible for an automobile to collide with a forwardly running vehicle, with a rearwardly following vehicle, or with a laterally spaced vehicle, to roll over, to fall along an inclined surface such as a cliff or fall into the water. Accordingly, if a conventional automatic emergency signal emitter is mounted on the vehicle, there is the possibility that a signal can be automatically emitted in the event of an accident with little effect if any. For automobiles, accidents of various types may occur in which the life of an occupant may be saved by an immediate rescue if he is immovable. Accordingly, it will be seen to provide it is highly advantageous that a signal that can be reliably and automatically emitted in the event of an accident.

SUMMARY OF THE INVENTION

It is an object of the invention to provide an automatic signal emitter on a vehicle which automatically emits an emergency signal in the event of an accident.

The above object is accomplished in accordance with the invention by providing an automatic signal emitter on a vehicle comprising at least two detecting means which may include a first detecting means which produces a signal representing an acceleration in both the fore-and-aft direction and the lateral direction of a vehicle, a second detecting means which produces a signal reresenting the inclination of the vehicle and a third detecting means which produces a signal indicating the presence or absence of water within the vehicle. A signal transmitting means and a control for energizing the signal transmitting means are also provided to produce an emergency signal whenever at least one of the aforementioned detecting means produces an abnormality signal.

When a vehicle collides with another vehicle which is located either forwardly or rearwardly or on either lateral side, there occurs an acceleration of an increased magnitude in the horizontal plane, thus allowing the first detecting means to detect the occurrence of an abnormality. When the vehicle rolls over, the vehicle will go through an angular movement through an arc of an increased angle, allowing the second detecting means to detect the occurrence of an abnormality. Finally, if the vehicle falls into the sea or river, the ingress of water into the vehicle the third detecting means to detect the occurrence of an abnormality. Thus either one of the detecting means detects the occurrence of an abnormality in the event of an accident of any kind, thus automatically emitting an emergency signal. It is sufficient to monitor the occurrence of at least two of the abnormalities including the acceleration, the inclination and the immersion in water in order to determine the occurrence of an accident.

It will be understood that when emitting an emergency signal, it is preferred to use a radio wave since this enables a transmission over an increased distance. The use of a radio wave requires the provision of an antenna which is exposed externally of the vehicle for transmitting a signal. However, in the event of a collision or rollover, part of the vehicle may be damaged. If the antenna is located in the damaged area, the transmission of a radio wave is disabled even though the occurrence of an accident has been successfully detected. If the antenna is not damaged, the transmission of a radio wave over an increased distance is also prevented if the body of the vehicle has been inclined such that the antenna is located close to or into contact with the ground or has become hidden below the body. Accordingly, a plurality of antennae are located at different locations on the vehicle in a preferred embodiment of the invention.

The plurality of antennae are connected in parallel to the output of a transmitter. If any one of the antennae is damaged during the accident and presents an impedance of either zero or infinity, the transmitter will be loaded in an abnormal manner, causing the transmitter to fail within a reduced length of time if it continues to be operated under such condition. In this instance, the signal ceases to be transmitted before a rescue party is able to recognize the location of the accident, again preventing a rescue. For this reason, in a preferred embodiment of the invention, the emission of an emergency signal takes place by selecting one of the plurality of antennae and sequentially changing the antenna selected.

In this manner, a continued connection of an abnormal load with the transmitter is prevented in the event certain antennae exhibit abnormal impedance or impedances, thus enabling the transmission of a radio wave over a prolonged length of time.

BRIEF DESCRIPTION OF THE DRAWINGS

FIG. 5b is a perspective view showing part of the detector shown in FIG. 5a; and FIG. 6 graphically shows the waveforms of various signals appearing in the signal emitter of the invention.

DESCRIPTION OF PREFERRED EMBODIMENT

Figure 1:
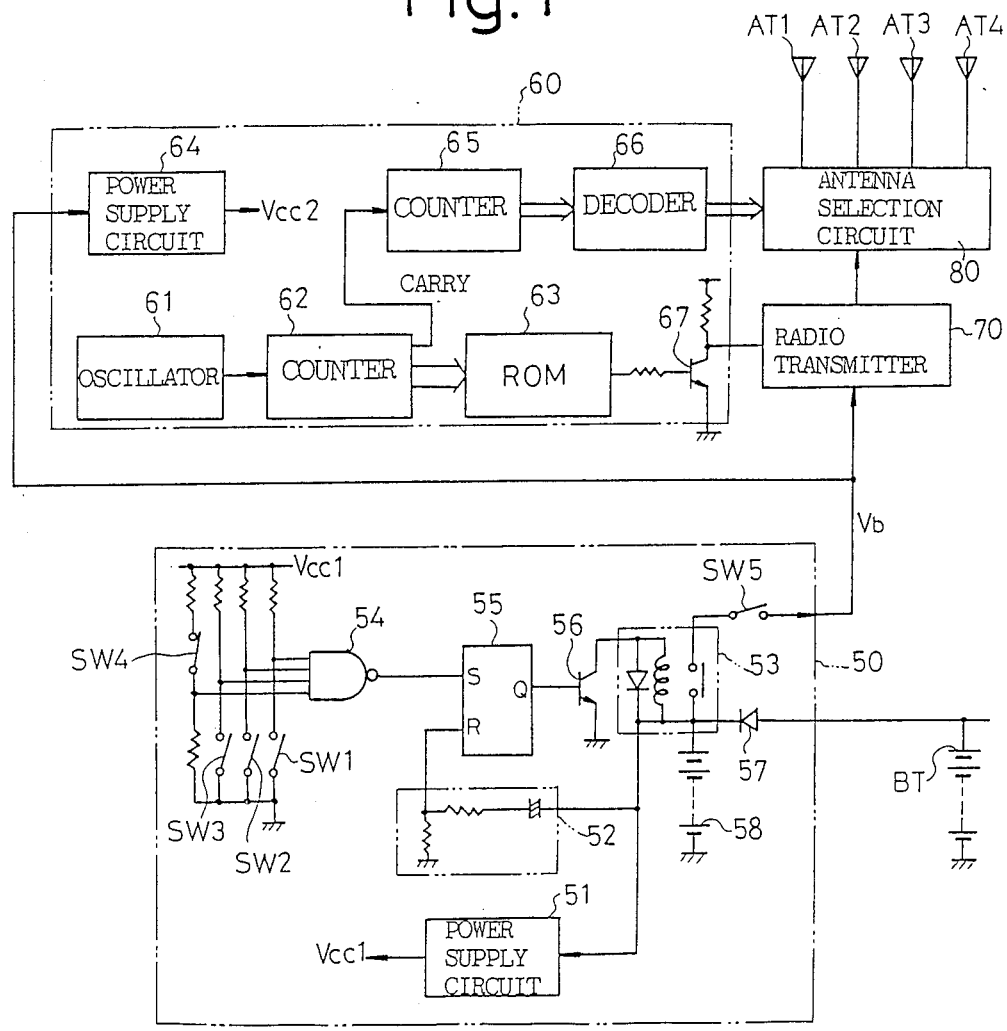
FIG. 1 is a block diagram of a signal emitter on a vehicle according to an embodiment of the invention.

Referring to the drawings, an embodiment of the invention will be described. FIG. 1 shows an emergency signal emitter on vehicle according to an embodiment of the invention. The emitter generally comprises an emergency decision circuit 50, a signal generator 60, a radio transmitter 70, an antenna selection circuit 80 and a plurality of antennae AT1, AT2, AT3 and AT4. In the example shown, the antennae AT1 AND AT2 are mounted on the front bumper at its right and left ends while the antennae AT3 and AT4 are mounted on the rear of a trunk lid at its left and right ends (see FIG. 2). By disposing the plurality of antennae at mutually spaced positions, it is assured that at least one of the antennae can be left intact upon occurrence of any accident. In the embodiment, the antenna switching circuit 80 selectively connects one of the four antennae to the output terminal of the radio transmitter 70. The selection is controlled by the signal generator 60.

The emergency decision circuit 50 includes a plurality of switches SW1, SW2, SW3, SW4, a power supply circuit 51, a reset circuit 52, a relay 53, NAND gate 54, RS flipflop 55, a transistor 56, a diode 57, an inboard battery 58 and a switch SW5. The purpose of the four switches SW1 to SW4 is to determine the occurrence of an accident. The switch SW1 is a manual switch which can be turned on and off by an operation of a driver. The switch SW1 is located at a point below an instrument panel where it is relatively inaccessible. The switches SW2, SW3 and SW4 represent electrical contacts of an acceleration detector 30, an inclination detector and an immersion detector 10 which will be described later. The switches SW1 to SW3 are normally open, but can be closed upon occurrence of any abnormality. The switch SW4 is normally closed and is opened upon the occurrence of any abnormality. Thus, if any one of the detectors detects the occurrence of an abnormality or when the driver turns the manual switch SW1 on, there is produced a high level H at the output terminal of NAND gate 54. RS flipflop 55 is initially reset by the reset circuit 52, whereby its output terminal Q normally assumes a low level L. However, when the output terminal of NAND gate 54 changes to its high level H, the flipflop 55 is set to provide a high level H at its output terminal Q. The inboard battery 58 represents a rechargeable nickel cadmium battery, and is connected through the diode 57 to a vehicle mounted battery BT. In this manner, the battery 58 is normally charged to a given level. The transistor 56 is normally turned off, whereby the relay 53 has its contacts in an open condition. When the output terminal Q of the flipflop 55 assumes a high level H, the transistor 56 is turned on, whereby the relay contacts are closed.

The switch SW5 is mechanically interlocked with an ignition switch, and is turned on and off in accordance with an operation of an engine key within its associated key cylinder. Accordingly, this switch is closed when an accident occurs. When the switch SW5 is turned on, the energization of the relay 53 is effective to feed the signal generator 60 and the radio transmitter 70 from the battery 58 through the relay contacts and the switch SW5, thus preparing the signal generator and the radio transmitter for operation. In the example shown, the radio transmitter 70 is a CW (continuous wave or Morse code) transmitter which represents information in terms of the presence or absence of a radio wave or carrier. It has a control terminal connected to the output terminal of the signal generator 60 which controls the transmission of a radio wave on and off. Thus, information transmitted is produced by the signal generator 60.

FIG. 6 graphically shows timings when various signals in the signal generator 60 and the radio wave are developed. The operation of the signal generator 60 will be described with reference to FIG. 6. The signal generator 60 repeatedly produces a Morse code in dots and dashes representing "SOS" or "●●●————●●●". It comprises an oscillator 61, a counter 62, ROM (read-only-memory) 63, a power supply circuit 64, another counter 65, a decoder 66 and a transistor 67. The oscillator 61 continuously delivers a square wave signal with a period of about 60 msec, in the example shown, and the counter 62 counts the square wave signal. A count in the counter 62 is applied to an address terminal of ROM 63. A carry or overflow signal from the counter 62 is applied to a count input of the counter 65. In the example shown, the counter 62 operates with a radix of 30 while the counter 65 represents a quaternary counter.

ROM 63 stores data representing a Morse code to be transmitted in terms of "1" corresponding to a dash and "0" corresponding to a dot, spaced apart by a time interval of 60 msec, at thirty consecutive addresses. Accordingly, as the counter 62 begins counting, a binary bit stored at the respective addresses of ROM 63 is sequentially read out, thus forming the Morse code. When the output terminal of ROM 63 assumes a low level L, the transistor 67 is turned off and the radio transmitter 70 ceases to transmit a radio wave. However, when the output terminal of ROM 63 assumes a high level H, the transistor 67 is turned on to enable the radio transmitter 70 to transmit a radio wave.

During the time the count in the counter 62 changes from 0 to 29, data representing a single run of "SOS" is delivered from ROM 63. Each time the data for a single run of "SOS" is delivered, a carry signal is delivered from the counter 62 to change the count in the counter 65. The antenna selection circuit 80 responds to a count of 0, 1, 2 and 3 in the counter 65 by selecting the antennae AT1, AT2, AT3 and AT4, respectively. Since the count in the counter 65 changes in the manner of 0, 1, 2, 3, 0, 1, . . . , the particular antenna selected is sequentially changed in the manner of AT1, AT2, AT3, AT4, AT1, AT2, . . . . Since the radio wave is not transmitted at the moment when the antenna is changed, a change in the impedance which occurs during the switching operation has no adverse influence upon the radio transmitter 70.

Figure 3:
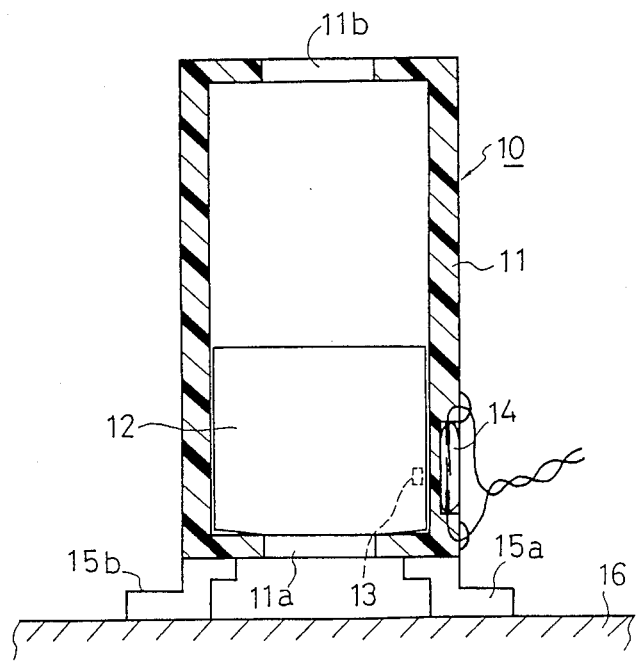
FIG. 3 is a longitudinal section of an immersion detector shown in FIG. 1.

FIG. 3 shows the detail of the immersion detector 10. In this example, the immersion detector 10 is disposed underneath the driver's seat or on the floor of the compartment. Specifically, it comprises a cylindrical casing 11 having openings 11a and 11b formed in its bottom and top. The casing 11 is secured to the floor 16 of the body of the vehicle by means of support members 15a, 15b, which are secured to the bottom of the casing. A float 12 which is substantially in the form of a hollow cylinder is disposed within the casing 11 in a manner such that the float 12 is incapable of rotation relative to the casing 11. A permanent magnet 13 is embedded within the float 12 adjacent to the surface thereof, while a reed switch 14 is mounted within the casing 11 at a location opposite to the permanent magnet 13. Accordingly, the permanent magnet 13 is located opposite to the reed switch 14 normally or under the condition shown in FIG. 3, thus closing the contacts of the reed switch 14 or the switch SW4. However, when water finds its way into the compartment and rises to a given level, the float 12 begins to rise, whereby the permanent magnet 13 moves away from the reed switch 14, opening the contacts of the switch 14.

Figure 4A:
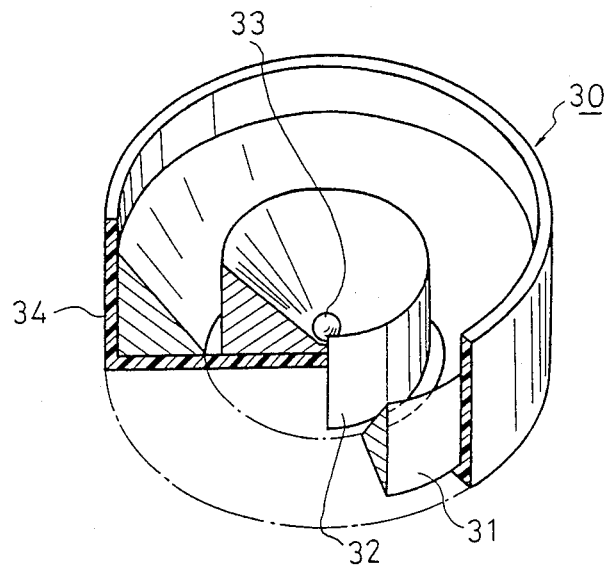
FIGS. 4a and 4b are perspective views, partly cut away, and a longitudinal section of an acceleration detector shown in FIG. 1.
Figure 4B:
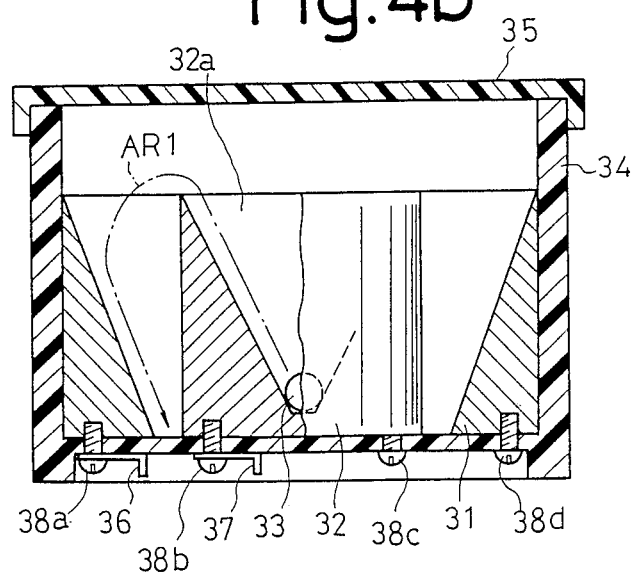

FIGS. 4a and 4b show the construction of the acceleration detector 30. It comprises a casing 34 and a lid 35, both of which are formed of an insulating material. The casing 34 is cylindrical in configuration and has a closed bottom. A pair of electrodes 31 and 32 and a metal ball 33 are disposed within the casing. The electrode 31 is secured to the casing 34 by set screws 38a and 38d while the electrode 32 is secured to the casing 34 by set screws 38b and 38c. It is to be noted that a pair of terminals 36 and 37 are fixedly connected to the screws 38a and 38b. The electrode 31 is annular in plan view and has a transverse section which is in the form of a right angled triangle. Thus, the inner wall of the annulus is a slope, and the inner diameter decreases toward the bottom of the casing 34. The electrode 32 is in the form of a solid cylinder in which a V-shaped depression 32a is formed extending from one end toward the other end. The ball 33 is normally situated within the depression 32a. The electrode 32 has an outer diameter which is slightly less than the minimum inner diameter of the electrode 31, whereby the electrodes 31 and 32 are electrically insulated from each other. Thus, the terminals 36 and 37 are insulated from each other. However, when an acceleration is developed in the horizontal plane, the ball 33 is movable within the remaining parts that are secured to the body of the vehicle, so that it runs up the inner slope of the electrode 32 to jump out of the depression 32a and then falls between the electrodes 31 and 32, as indicated by an arrow AR1 shown in FIG. 4b. Thus, an electrical path is completed between the electrodes 31 and 32 by the presence of the ball 33. In this manner, the combination of the electrodes 31, 32 and the ball 33 defines the switch SW2, which becomes closed upon detecting an acceleration of an increased magnitude.

Figure 5A:
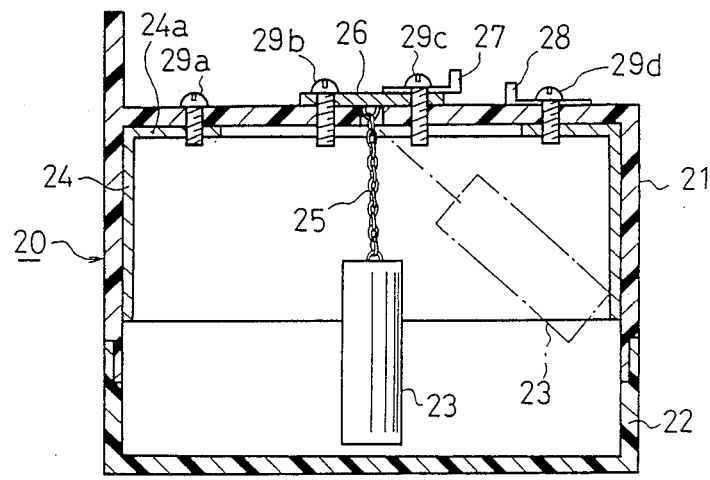
FIG. 5a is a longitudinal section of an inclination detector shown in FIG. 1.
Figure 5B:
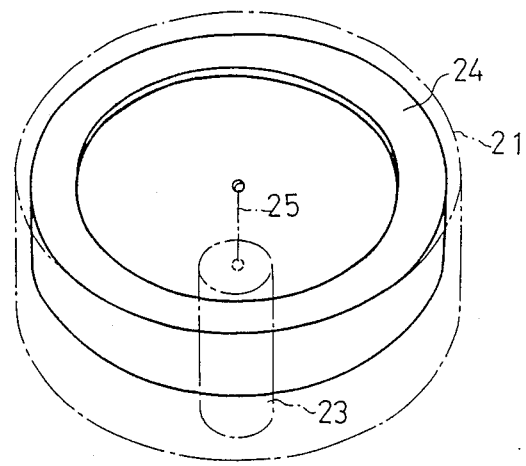

FIGS. 5a and 5b show the construction of the inclination detector 20. It comprises a casing formed by a pair of cylindrical members 21 and 22 having a hollow cylindrical space therein. A cylindrical electrode 24 is disposed in the top portion of the casing, and has a radially extending flange 24a which is secured to the member 21 by set screws 29a, 29d. A terminal 28 is fixedly connected with the screw 29d. A metal plate 26 is secured centrally on the top end of the casing by set screws 29b, 29c. A metallic weight 23 is suspended from the metal plate 26 by a metal chain 25. It will be seen that a terminal 27 is fixedly connected with the screw 29c. It will be understood that the chain 25 and the weight 23 are normally oriented in the vertical direction, so that if the electrode 24 assumes a horizontal position as shown in FIG. 5a, the weight 23 is spaced from the electrode 24, providing no conduction therebetween. However, when the body of the vehicle swings to one side through an increased stroke, the electrode 24 also assumes an inclined position while the weight 23 remains unchanged in its position, whereby the both contact as indicated by phantom line in FIG. 5a. The combination of the weight 23 and the electrode 24 defines the switch SW3, which becomes closed upon detecting an inclination through an increased angle.

Figure 2:
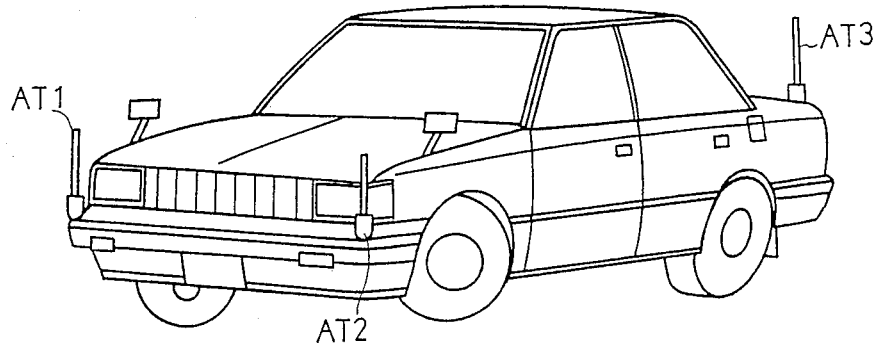
FIG. 2 is a perspective view of an automobile on which the emitter shown in FIG. 1 is mounted.

The main part of the emergency signal emitter, the inclination detector 20 and the acceleration detector 30 are disposed within a trunk room of the automobile shown in FIG. 2, toward the rear seat.

It will be appreciated that there is a likelihood that the automobile could completely rolled over or where the impact of the collision is severe. However, even in such instance, it is improbable that none of the detectors is able to detect the occurrence of an abnormality before the switch operation is disabled. Since the embodiment shown in FIG. 1 includes the flipflop 55, once the occurrence of an abnormality is detected, such detection is maintained to enable the continued emission of a signal irrespective of the subsequent condition of the detector or detectors. Accordingly, the emission of a signal is assured in the event of an accident of any kind. As long as the driver has a clear consciousness, he is able to operate the manual switch SW1 to trigger the emission of a signal manually.

In the described embodiment, the immersion detector 10 has been described as disposed within the compartment, but it may be disposed inside the hood or within the trunk. In addition, while the embodiment has one detector for each type, a plurality of such detectors may be provided for each type. Finally, while a radio wave has been used as a signal to be transmitted in the embodiment described above, an acoustic or optical signal may also be employed.

From the foregoing, it will be appreciated that the invention enables an automatic emission of a signal for asking a rescue from a remote location in the event of an automobile accident if the driver has lost consciousness or is unable to request assistance.

What is claimed is:

1. An automatic signal emitter on a vehicle comprising:

at least two of three detecting means mounted on a vehicle including first detecting means which produces a signal responsive to an acceleration of the vehicle in a fore-and-aft direction and in a lateral direction, second detecting means which produces a signal responsive to an inclination of the vehicle and a third detecting means which produces a signal responsive to a presence or absence of water within the vehicle;

signal transmitting means for transmitting a radio wave and including a plurality of antennae which are disposed at mutually different locations on the vehicle; and control means for energizing the signal transmitting means whenever at least one of the first to the third detecting means has produced a signal indicating the occurrence of an abnormality, wherein the control means repeats a given signal transmission and selects one of the plurality of antennae for connection to the output terminal of the signal transmitting means and sequentially changes the antenna which is connected to the output terminal of the signal transmitting means upon each completion of the signal transmission.

* * * * *